US010579457B1

(12) United States Patent
White (10) Patent No.: US 10,579,457 B1
(45) Date of Patent: Mar. 3, 2020

(54) PROCESSOR FOR ACHIEVING FLOW INTEGRITY AND A METHOD OF PROVIDING NOTICE OF A FAULT IN CONTROL FLOW

(71) Applicant: The Government of the United States as Represented by the Director, National Security Agency, Fort George G. Meade, MD (US)

(72) Inventor: Andrew H White, Baltimore, MD (US)

(73) Assignee: Government of the United States, as represented by Director National Security Agency

( * ) Notice: Subject to any disclaimer, the term of this patent is extended or adjusted under 35 U.S.C. 154(b) by 45 days.

(21) Appl. No.: 15/802,927

(22) Filed: Nov. 3, 2017

(51) Int. Cl.
*G06F 11/00* (2006.01)
*G06F 11/07* (2006.01)
*G06F 21/55* (2013.01)
*G06F 9/30* (2018.01)
*G06F 21/54* (2013.01)

(52) U.S. Cl.
CPC ........ *G06F 11/0772* (2013.01); *G06F 9/3005* (2013.01); *G06F 11/0721* (2013.01); *G06F 21/54* (2013.01); *G06F 21/554* (2013.01)

(58) Field of Classification Search
CPC ..................................................... G06F 9/3005
See application file for complete search history.

(56) References Cited

U.S. PATENT DOCUMENTS

2008/0120492 A1* 5/2008 Dye ...................... G06F 9/3005
712/225

OTHER PUBLICATIONS

White et al., Systems support for Hardware Anti-ROP, Jul. 18, 2017, https://galois.com/, 17 pages (Year: 2017).*
Abadi et al., Control-flow integrity, Nov. 7, 2005, https://dl.acm.org, 14 pages (Year: 2005).*

* cited by examiner

*Primary Examiner* — Katherine Lin (57) ABSTRACT

A processor and methods are provided for detecting fault in a control flow. The processor includes an instruction set architecture defining a pair of FLOWSET and FLOW-CHECK opcodes and FLOWSET and FLOWCHECK operations. This pair of opcodes and associated operation works together with a CFI shadow stack to detect faults in an intended flow of instructions. Upon detection of a fault, a fault notice is provided. The methods of detecting fault in a control flow may be implemented using hardware or software and a shadow stack.

12 Claims, 8 Drawing Sheets

PROCESSOR FOR ACHIEVING FLOW INTEGRITY AND A METHOD OF PROVIDING NOTICE OF A FAULT IN CONTROL FLOW

FIELD OF THE INVENTION

This invention is generally directed to a processor which provides control flow integrity and a method of providing notice of a fault in control flow.

BACKGROUND OF THE INVENTION

Return-oriented programming (ROP) is a computer security exploit technique in which an attacker uses software control of a stack to execute an attacker-chosen sequence of machine instructions. These instructions typically end with a programmer-intended or unintended return (RET) instruction within existing programming code. The intended or unintended RET instruction transfers execution to the attacker-chosen return address on the stack and allows the attacker to retain execution control through the program code, and direct execution to the next set of attacker-chosen instructions to achieve the attacker's intent. The attacker-chosen instruction sequences are referred to as gadgets. A gadget can also end with an indirect jump or indirect call instruction.

By chaining together a set of these gadgets such that the indirect branch (i.e. return, jump or call) from one gadget lands into the next gadget and so on, the malware writer is able to execute a complex algorithm without injecting any code into the program, which can be referred to as code-reuse or ROP (return oriented programming). This is commonly referred to as gadget chaining.

The ROP technique involves injecting a payload into the memory of a program by using vulnerabilities like stack buffer overflows. The payload usually contains a set of pre-computed chained pointers to gadgets and parameters. The exploit then needs to redirect control by overwriting the data used in an indirect branch to point to the first gadget instead of the intended destination. This also is usually accomplished by memory corruption. After the initial control flow re-direct, the ROP-chain continues.

A method for defending against such ROP attacks was described in a 2015 publication by the National Security Agency titled Hardware Control Flow Integrity (CFI) for an IT Ecosystem. NSA's 2015 paper describes a control flow integrity process which uses a branch flag in connection with a new "landing point" (LP) instruction to protect forward edges of a control flow graph and a shadow stack to protect return edges of a control flow graph. This control flow integrity process provides that after an indirect branch instruction, if a landing point instruction does not immediately occur, a fault notice is provided.

A direct branch instruction is a branch instruction that provides the destination of the instruction as data stored in read-only memory. This read-only memory is part of the direct branch instruction, therefore it cannot be maliciously altered. An indirect branch instruction uses a computed destination such as jump indirect, call indirect or return. These computed destinations can be maliciously altered. The instruction set architecture (ISA) of the control flow integrity process described in NSA's paper defines a landing point (LP) opcode and the associated LP operation for use in connection with indirect branch instructions. The LP operation is used in combination with a branch flag and a shadow stack to provide notice of a fault in the control flow.

The branch flag is logically equivalent to a bit in a status register. The branch flag has two modes: a branch flag "on" mode (i.e., BF=ON) and a branch flag "off" mode (i.e., BF=OFF). Execution of an indirect branch instruction sets the mode of the branch flag to "ON". In the branch flag ON mode, the only instruction which may be executed by the processor, without causing a fault notice, is the landing point instruction (LP). If an attempt to execute any other instruction occurs while BF=ON, then the processor issues a fault notice. Execution of the LP instruction sets the branch flag OFF. In the branch flag OFF mode, all types of instructions may be executed by the processor, including landing point instructions.

A shadow stack is also used to ensure control flow integrity. The shadow stack is a stack separate from the data stack and includes a shadow stack pointer which points to the top position of the shadow stack. The shadow stack is a protected stack that protects the return address, i.e., the address of the instruction to be executed upon return of control to the call site. The shadow stack is protected because only a limited number of functions provide access to the shadow stack. For example, access to the shadow stack may be limited to the functions "CALL" and "RET". Specifically, the function CALL provides the ability to write the return address on the shadow stack and the function RET provides the ability to read the data on the shadow stack at the position of the shadow stack pointer.

Upon execution of a CALL instruction, the return address is stored on both the data stack and the shadow stack. The RET operation is a shadow stack aware operation that pops the data stack and the shadow stack. When a RET instruction occurs, the top of the data stack and the shadow stack are compared. If the address on the shadow stack matches the address on the data stack, execution of instruction continues. If the addresses do not match, a fault notification is provided. If the values match, the processor continues execution of instructions at the return address.

The net effect of re-instrumenting existing code with landing points and shadow stack is to constrain redirectable gadgets to only blocks of code that start with a landing point and end with the indirect branch. To create a ROP chain necessary to gain control in this newly instrumented environment, the attacker would be limited to gadgets that are the result of intended compiler output instead of the much larger population of unintended gadgets that can be formed from bytes within legitimate compiler output. Furthermore, using a return branch, which is the predominant chaining technique today would no longer be feasible due to the shadow stack protection of the return address.

Figure 1:
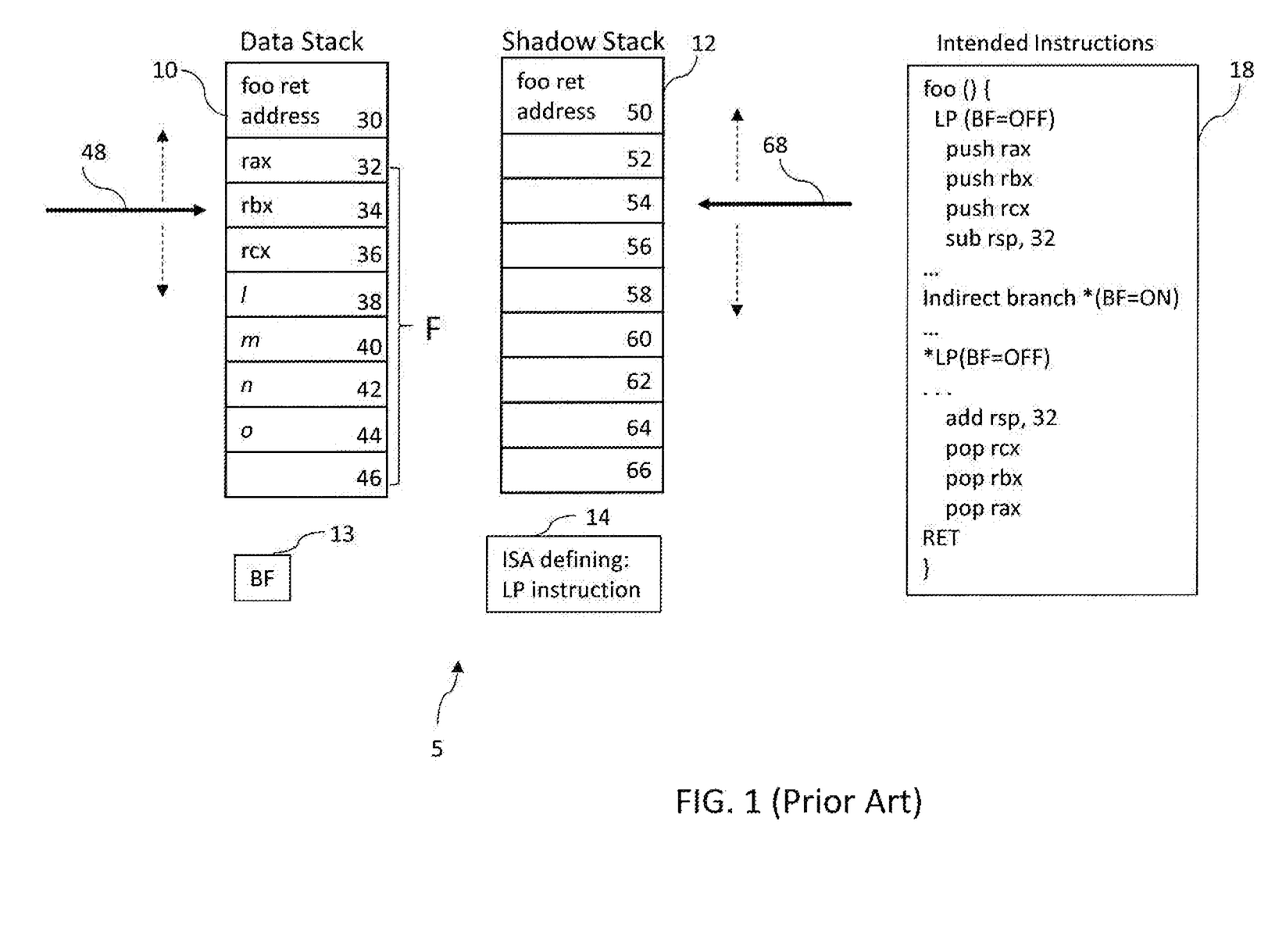
FIG. 1 illustrates a prior art processor and execution of an intended instruction set including a landing point instruction wherein the programmer intended flow is achieved.
Figure 2:
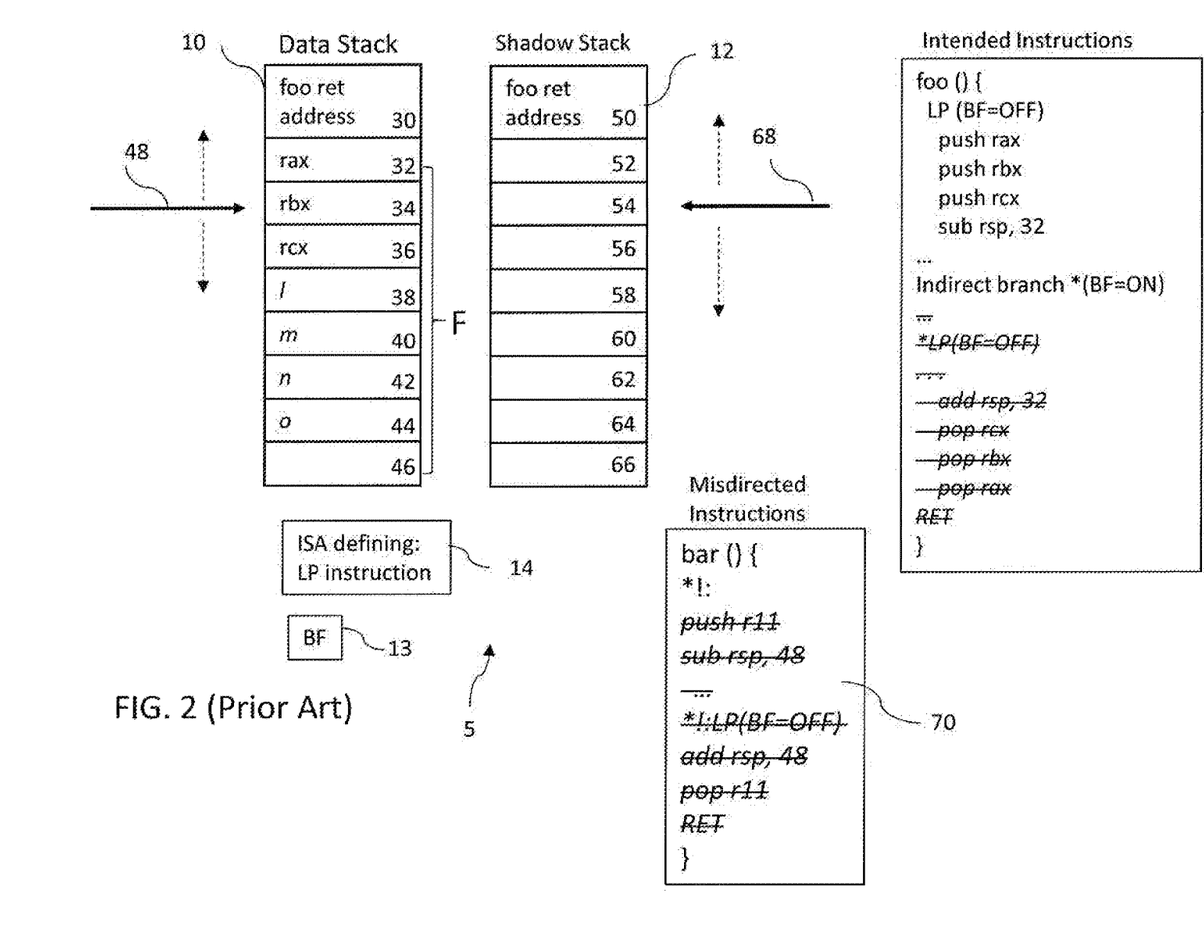
FIG. 2 illustrates a prior art processor and attempted execution of an intended instruction set including a landing point instruction wherein a flow to a misdirected program instruction is detected.
Figure 3:
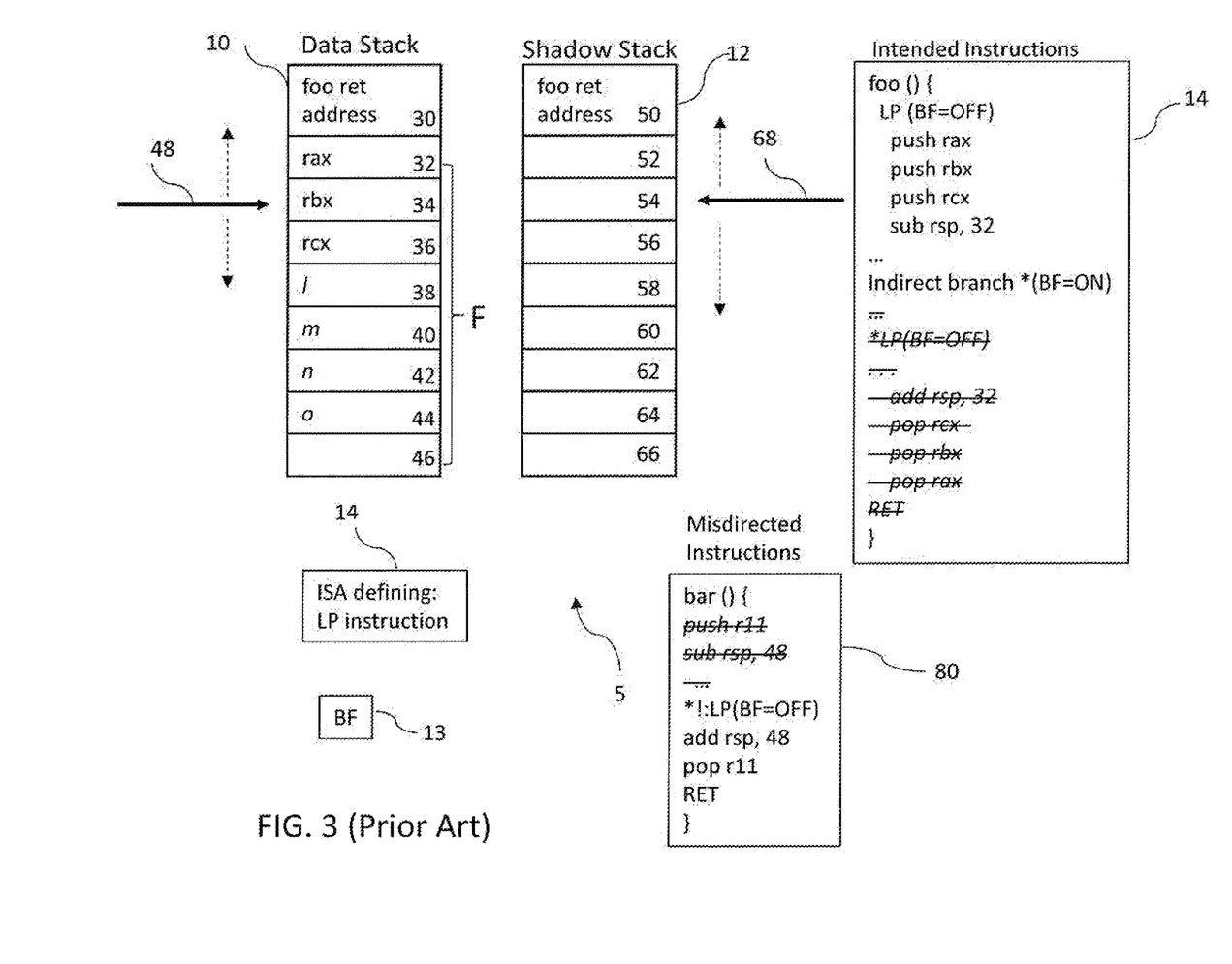
FIG. 3 illustrates a prior art processor and attempted execution of an intended instruction set including a landing point instruction wherein a misdirected program instruction is not detected.

FIGS. 1-3 illustrate operation of the LP instruction, in connection with a processor 5 including a data stack 10, a shadow stack 12, a branch flag 13 and an ISA 14 defining an LP opcode and an LP operation associated with the LP opcode. Specifically, FIG. 1 illustrates use of the LP instruction and a branch flag in connection with control flow as intended by the programmer.

The data stack 10 stores data relating to instructions executed by the processor 5. A number of positions, 30-46 are provided on the data stack 5 for storing data relating to the instructions to be executed by the processor 5. Positions 30-46 of the data stack 10 are illustrated in FIG. 1. Each position represents, for example, four bytes of memory. The processor 5 further includes a data stack pointer 48 associated with the data stack 10. The data stack pointer 48 is typically a register that identifies the current top of the stack and is illustrated in FIG. 1 as an arrow.

The shadow stack 12 is separate from the data stack 10 and is used exclusively for control transfer operations. A number of positions are provided on the shadow stack 12 for storing data relating to the control transfer instructions. A limited number of control transfer instructions are capable of writing to or reading from the shadow stack and are sometimes identified as "shadow stack aware instructions." Positions 50-66 of the shadow stack 12 are illustrated in FIG. 1. The processor 5 further includes a shadow stack pointer 68 associated with the shadow stack 12. The shadow stack pointer 68 is a register that identifies the current top of the shadow stack and is illustrated in FIG. 1 as an arrow. As instructions are executed, the shadow stack pointer 68 moves relative to the positions 50-66 of the stack. As instructions are executed which result in information being written onto or "pushed" onto the shadow stack, the shadow stack pointer 68 is moved down. As instructions are executed which result in data being read from or "popped" off of the shadow stack, the shadow stack pointer 68 is moved up. The shadow stack 12 is a protected stack. Protection is provided to the shadow stack 12 due to the limited types of ISA instructions which write to or read from the shadow stack 12. For example, instructions, providing access to the shadow stack 12 may be limited to CALL and RET. Specifically, the CALL instruction provides write access to the shadow stack 12 and the RET instruction provides read access to the shadow stack 12.

The processor 5 further includes an ISA 14 which defines the instructions the processor 5 will execute. The ISA 14 defines the landing point instruction LP.

A series of instructions are provided to the processor 5 including an instruction to call (CALL) function "foo". Upon execution of the CALL instruction, the address of the return, i.e. the address of the instruction to execute when foo returns to the call site ("foo ret address"), is pushed to position 30 the data stack 10 and the data stack pointer is aligned with position 32 of the data stack. "Foo ret address" is also pushed to position 50 of the shadow stack 12 and the shadow stack pointer is aligned with position 52 of the shadow stack 12. A set of intended instructions 18 provided by function foo is provided to the processor 5. As illustrated, the instruction LP is executed next, setting the BF mode to OFF. In the BF=OFF mode, A function prologue is executed which sets up a call frame of size F for intended function foo. For example, the "push rax" instruction results in the contents of register rax being pushed to the data stack 10 and alignment of the data stack pointer 48 with position 34; the "push rbx" instruction results in the contents of register rbx being pushed to the data stack 10 and alignment of the data stack pointer 48 with position 36; the "push rcx" instruction results in the contents of register rcx being pushed to the data stack 10 and alignment the data stack pointer with position 38; the data stack pointer 48 is then moved down 32 bytes (represented by l, m, n, o) and aligned with position 46. Execution of additional instructions, not shown, continues.

An indirect branch instruction is executed within the function foo directing control to pass to the intended address *. Execution of the indirect branch instruction sets the mode of the branch flag to ON (BF=ON) and control of instructions is passed to intended address *. At intended address *, an LP instruction is provided. Execution of the LP instruction, sets the mode of the branch flag to OFF (BF=OFF). Because the branch flag is in the "OFF" mode, the processor continues to execute all types of instructions.

Execution of additional instructions, not shown, continues. Eventually, a function epilogue for function foo() is executed which tears down the call frame of size F. Specifically, the data stack pointer 48 is moved up 32 bytes and the data stack pointer 48 is aligned with position 38; the contents of register rcx are popped from the stack and the data stack pointer 48 is aligned with position 36; the contents of register rbx are popped from the stack and the data stack pointer 48 is aligned with position 34; and the contents of register rax are popped from the stack, leaving the data stack pointer aligned with position 32 of the data stack 12.

Execution of the RET instruction, pops the data from the top of the stack 10 and the data stack pointer 48 is aligned with position 30 of the data stack 10. Execution of the RET instruction also pops the data from the top of the shadow stack 12 and the shadow stack pointer 68 is aligned with position 50 of the shadow stack 12. The data popped from the data stack 10 is compared to the data popped from the shadow stack 12. In the case illustrated in FIG. 1, the data popped from the data stack 10 is "foo ret address" and the address popped from the shadow stack 12 is "foo ret addresses" The data matches, therefore control returns to the too RET address.

FIG. 2 illustrates the same processor 5 of FIG. 1 along with the same intended set of instruction 18. FIG. 2 illustrates use of the branch flag and landing point instruction, to successfully identify and interrupt control flow not intended by the programmer. Instructions noted in FIG. 2 but stricken, indicate that the instructions are not executed by the processor. Specifically, function "foo" is called, and the address of the instruction to execute when foo returns, i.e. "foo ret address", is pushed to the data stack 10 and to the shadow stack 12. Execution of the LP instruction results in the branch flag 13 being turned off. A function prologue is executed which sets up a call frame of size F for function foo. Upon set up of the call frame, that data stack pointer 48 is aligned with position 46 of the data stack 10. Execution of additional instructions, not shown, continues.

An indirect branch instruction is provided within function foo, directing control to pass to intended address *. Execution of the indirect branch instruction sets the mode of the branch flag 13 to ON (i.e. BF=ON) and execution of instruction at address * is intended to occur. An attacker, however, manipulates the address * and forces execution to unintended address *! instead. At unintended address *!, a misdirected program flow 70 is provided and function "bar" is called. An LP instruction is not provided at unintended address *!, therefore the branch flag 13 remains in the "ON" mode. In the BF=ON mode, when the processor attempts execution of the instruction "push r11", a fault notice is provided.

FIG. 2 illustrates how landing points impose a coarse constraint on the forward edges of a control flow graph, i.e., an indirect branch can no longer branch to any instruction, it must branch to a landing point instruction. Landing points move the attacker from a world where there's no specification (i.e., branch to any address) to one with some specification (i.e., branching is limited to landing points). By limiting the instructions which will execute when a computed branch instruction is encountered, execution of unintended instruction flows is greatly reduced. A fully instrumented program will have landing points at the destination of every indirect branch.

Although the control flow integrity method described by NSA provides some control flow integrity, in certain scenarios the control flow may be compromised despite the use of the branch flag 13, the ISA defining the landing point opcode and operation 14, and the shadow stack 12. FIG. 3 illustrates a scenario in which despite the use of the branch flag 13, the ISA defining the landing point opcode and operation 14, and the shadow stack 12, control flow integrity (i.e. control flow intended by the programmer) was not maintained.

As illustrated in FIG. 3, function "foo" is called, and the address of the instruction to execute when foo returns, i.e. "foo ret address", is pushed to position 30 the data stack 10 leaving the data stack pointer 48 at position 32. "Foo ret address" is also pushed to position 50 of the shadow stack 12 leaving the shadow stack pointer 68 aligned with position 52. Execution of the LP instruction results in the branch flag 13 being turned off. A function prologue is executed which sets up a call frame of size F for function foo. Upon set up of the call frame, the data stack pointer 48 is aligned with position 46 of the data stack 10. Execution of additional instructions, not shown, continues.

An indirect branch instruction is executed within function foo. The indirect branch instruction sets the mode of the branch flag to ON and execution of instruction at an address * is intended to occur, however the attacker manipulates the intended address * and forces execution of instructions to unintended address *!. A misdirected program instruction set 80 is provided at unintended address *!. Further, at unintended address *! an LP instruction is provided.

At unintended address *!, execution of the LP instruction turns OFF the branch flag 13. Because the branch flag 13 is in the "OFF" mode, the processor executes all types of instructions. A function epilogue for bar is executed which tears down the call frame of size F. Specifically, the stack pointer is moved up 48 bytes leaving the data stack pointer aligned with position 32 of the data stack 10. Next, although the instruction indicates that the contents of register r11 are popped from the data stack 10, the data stack pointer 48 is aligned with position 32 of the data stack 10 and the contents of the incoming rax is popped from the data stack 10 leaving the data stack pointer 48 aligned with position 30. As a result of maliciously marrying the control flow between the prologue snippet of foo( ) with the epilogue snippet of bar( ), the intended functionality of the program was changed since foo( ) never intended to move the contents of register rax to r11. The value in rax when the processor returns to the call site of foo( ) will also be not what was intended by the program.

Execution of the RET instruction provides a comparison of the addresses at the data stack pointer 48 and the shadow stack pointer 68. Here, the data stack pointer 48 is aligned with position 30 and the address at position 30 is "foo ret address." The shadow stack pointer 68 is aligned with position 50 and the address on the shadow stack 12 is "foo ret Address." The address at the top of the data stack 10 matches the address at the top of the shadow stack 12, therefore a fault notice is not issued and control is passed to the return address at the function call site. Execution of the code continues despite the fact that the control flow was misdirected to the unintended program flow 80 and detection of the malicious activity is avoided.

Although use of landing points provides control flow integrity improvement at a minimal cost, as illustrated in FIG. 3, the LP instructions do not require branching to the specific programmer intended destination. When a malicious actor takes advantage of these engineer-able but unintended flows, a spectrum of unintended negative outcomes, can occur. Thus, a need exists for even greater control flow integrity to preventing the impact of these unintended flows.

SUMMARY OF THE INVENTION

Briefly, the present invention discloses a method and processor for maintaining control flow integrity (CFI)—for a set of program instructions to be executed by a processor and for providing a fault notification when a fault in the flow of instructions is detected. The CFI-enabled processor of the present invention includes an ISA defining variable independent FLOWSET and FLOWCHECK opcodes and associated FLOWSET and FLOWCHECK operations. The paired FLOWSET and FLOWCHECK instructions are used to identify an entry point and an exit point for the block of instructions for which control flow integrity is to be ensured. Upon compiling the FLOWSET and FLOWCHECK instructions into the software at strategic locations, FLOWSET and FLOWCHECK opcodes are provided for execution by the CFI-enabled processor with no further specification required. The method of maintaining CFI may be implemented by the CFI enabled processor or may be implemented with a legacy processor using flowset and flowcheck functions which utilize the shadow stack.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 4:
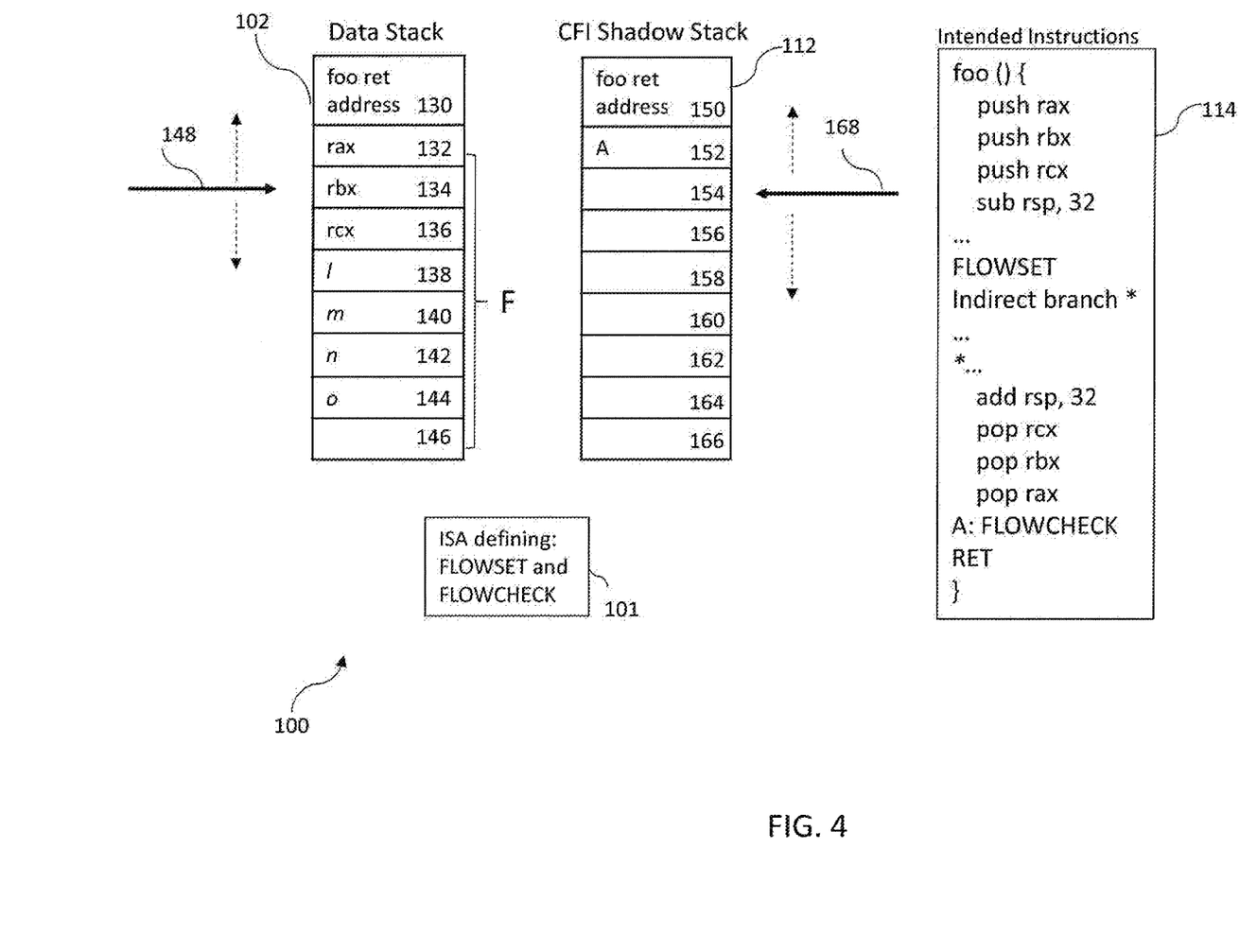
FIG. 4 illustrates the CFI-enabled processor of the present invention and execution of an intended instruction set including FLOWSET and FLOWCHECK instructions wherein the programmer intended flow is achieved.
Figure 5:
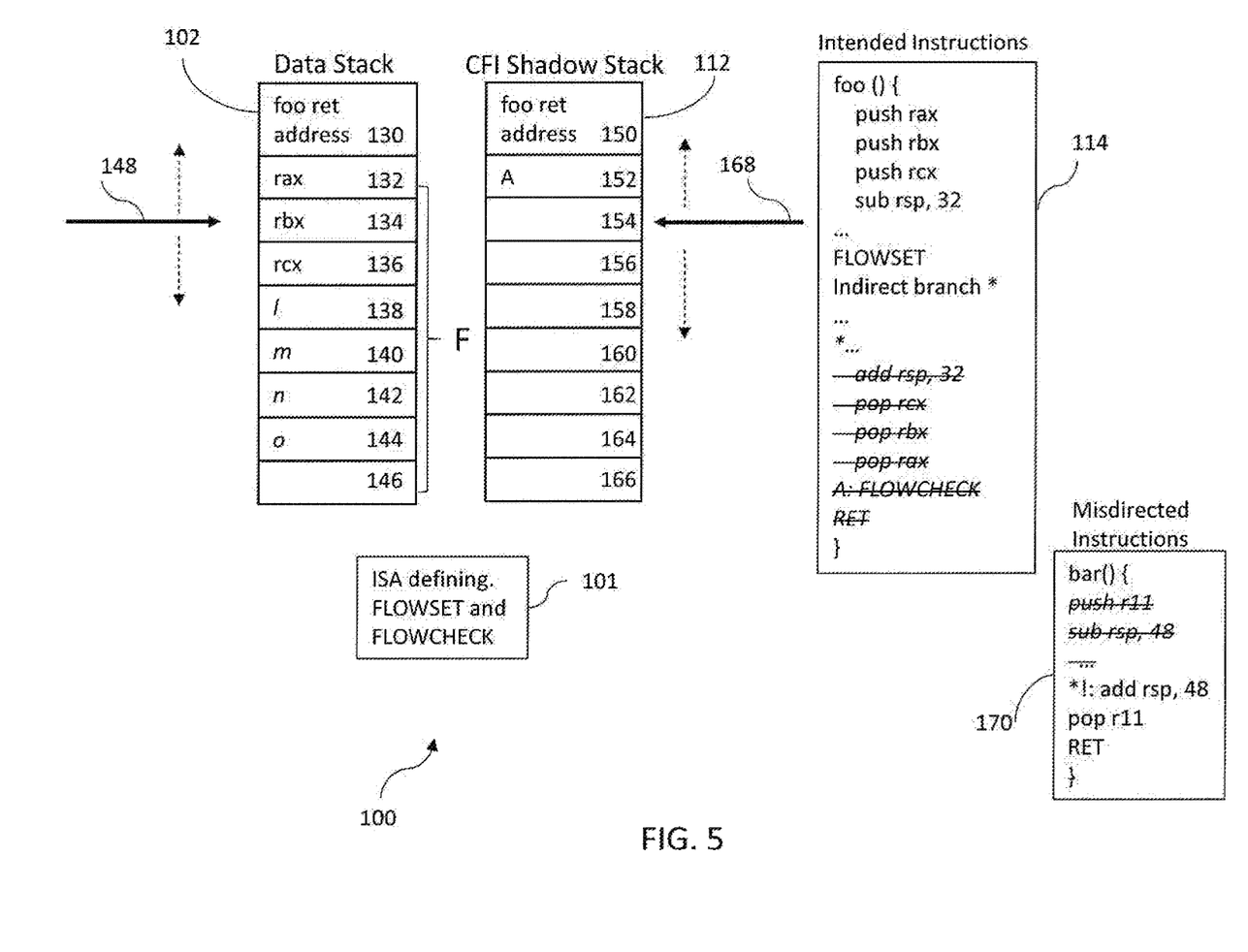
FIG. 5 illustrates the CFI enabled processor of the present invention and attempted execution of an intended instruction set including FLOWSET and FLOWCHECK instructions wherein flow to a misdirected program instruction is detected.
Figure 6:
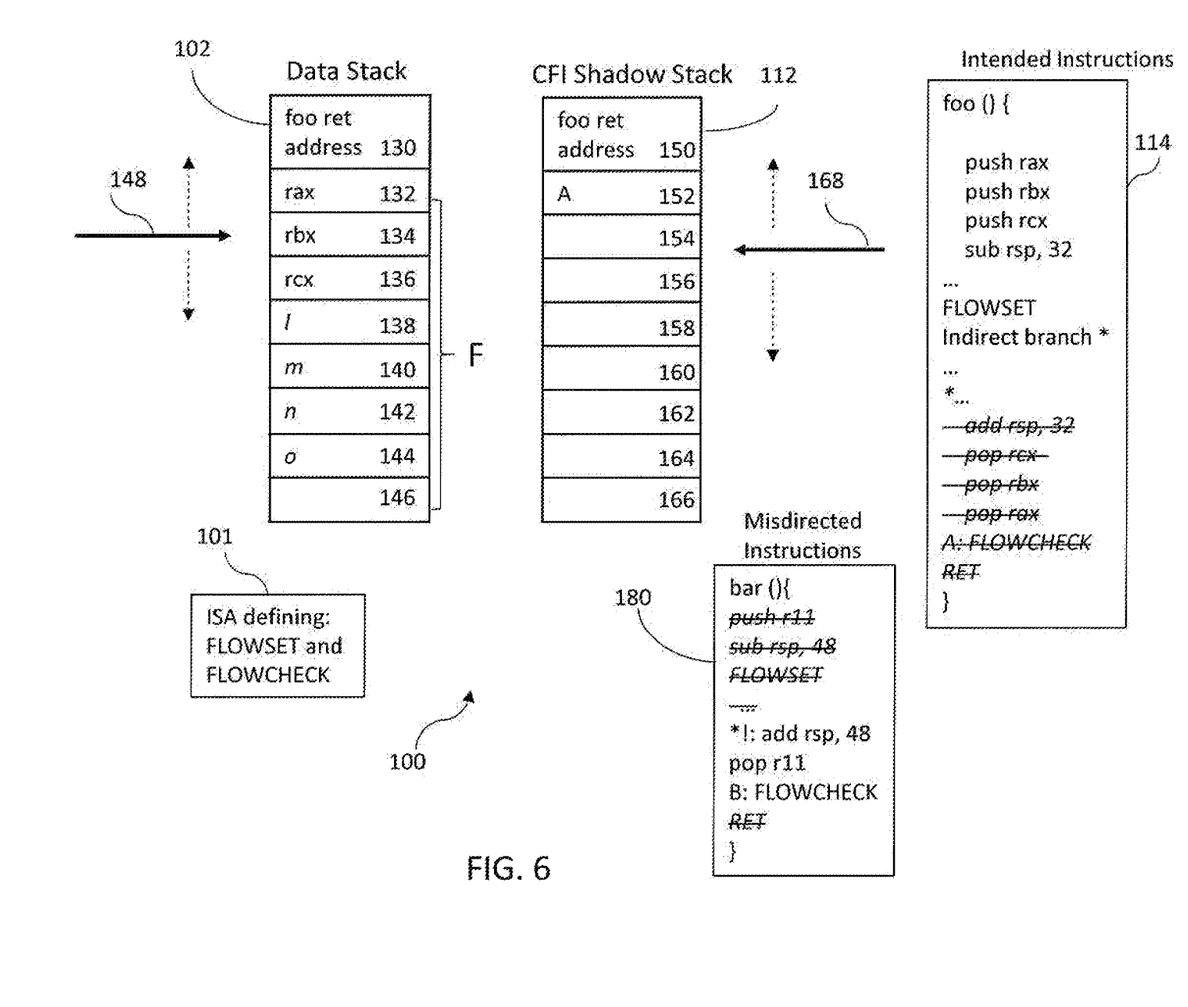
FIG. 6 illustrates the CFI enabled processor of the present invention and attempted execution of an intended instruction set including FLOWSET and FLOWCHECK instructions wherein flow to a misdirected program instruction is detected.

The CFI-enabled processor 100 of the present invention is illustrated in FIGS. 4-6.

The CFI-enabled processor 100 includes an instruction set architecture (ISA) 101 defining opcodes the processor 100 will execute and the operations associated with those opcodes, a data stack 102 and a CFI shadow stack 112.

An ISA typically includes variable dependent instructions, variable independent instructions and NOP codes. An example of a variable dependent instruction is "move rax, rbx." This typical ISA instruction includes the operation "move" followed by a label identifying the register whose content is to be moved (rax), which in turn is followed by the label identifying the new location where the contents of the register are to be moved (rbx). The portion of the instruction following the opcode, e.g. "rax, rbx" is an operand. The operand will vary depending upon the specific operation to be performed. When this instruction is assembled or compiled, an opcode is provided which represents both the operation (i.e. move) and the operand (i.e. rax, rbx). Thus, the resulting opcode is variable dependent. Examples of a variable independent instructions are HLT or NOP. A variable independent instruction does not include an operand. When these variable independent instructions are complied, the resulting opcode is always the same. A NOP operation is such an instruction, the explicit purpose of which is to not change the state of any of the programmer accessible registers, status flags, or memory. Typically an ISA may reserve several different opcodes as NOP instructions.

The ISA 101 of the CFI-enabled processor 100 defines opcodes and operations associated with those opcodes to be executed by the processor 100. The ISA 101 of the CFI-enabled processor 100 defines variable independent opcodes FLOWSET and FLOWCHECK and the operations associated with the variable independent opcodes FLOWSET and FLOWCHECK. As will be described herein, execution of the pair of opcodes works in conjunction with the CFI shadow stack 112 to detect unintended flow control.

The data stack 102 stores data relating to opcodes executed by the processor 100. A number of positions are provided on the data stack 110 for storing data relating to the opcodes executed by the processor. Positions 130-146 of the data stack 102 are illustrated in FIG. 4. Each position represents, for example, four bytes of memory. The processor 100 further includes a data stack pointer 148 associated with the data stack 102. The data stack pointer 148 is a small register that identifies a program request relating to the data stack 102 and is illustrated in FIG. 4 as an arrow. Write and read operations to and from the data stack 102 operate on a LIFO basis. Thus, the last data written to the data stack 102 will be the first data read from the data stack 102. The position of the data last written to the data stack 102 is referred to as the "top" of the data stack. As instructions are executed, the data stack pointer 148 moves relative to the positions 130-146 of the data stack.

The CFI shadow stack 112 is a stack separate from the data stack 102 and is used exclusively for control flow operations. A number of positions are provided on the CFI shadow stack 112 for storing data relating to the control flow operations. A limited number of opcodes are associated with operations which are capable of writing to or reading from the CFI shadow stack 112, these operations are referred to as "CFI shadow stack aware operations". Positions 150-166 of the CFI shadow stack 112 are illustrated in FIG. 4. The processor 100 further includes a CFI shadow stack pointer 168 associated with the CFI shadow stack 112. The CFI shadow stack pointer 168 is a register that identifies the top of the shadow stack and is illustrated in FIG. 4 as an arrow. Write and read operations to and from the CFI shadow stack 112 operate on a LIFO basis. Thus, the last data written to the CFI shadow stack 112 will be first data read from the CFI shadow stack 112. As instructions are executed, the CFI shadow stack pointer 168 moves relative to the positions 150-166 of the CFI shadow stack. As instructions are executed which result in information being written onto or "pushed" onto the CFI shadow stack 112, the stack pointer 168 is moved down. As instructions are executed which result in data being read from or "popped" off of the CFI shadow stack 112, the CFI shadow stack pointer 168 is moved up. The position of the data last written to the CFI shadow stack 112 is referred to as the "top" of the CFI shadow stack.

The CFI shadow stack 112 is a protected stack. Protection is provided to the CFI shadow stack 112 due to the limited number of opcodes which define operations writing to or reading from the CFI shadow stack 112. For example, the operations, providing access to the CFI shadow stack 112 may be limited to those operations associated with the opcodes CALL, RET, FLOWSET, and FLOWCHECK. Specifically, the operations associated with the CALL and FLOWSET opcodes provide write access to the CFI shadow stack 112 and the operations associated with the RET and FLOWCHECK opcodes provide read access to the CFI shadow stack 112.

The operation associated with the FLOWSET opcode provides that upon execution of the FLOWSET opcode by the CFI-enabled processor 100, the address of the paired FLOWCHECK opcode, is written to the top of CFI shadow stack 112. The operation associated with the FLOWCHECK opcode provides that upon execution of the FLOWCHECK opcode, the top of the CFI shadow stack 112 is read and compared to the address of the FLOWCHECK opcode. If the data and address match, control flow integrity is confirmed and execution of the program continues. If the data and address do not match, a fault notice is provided.

Operations associated with the FLOWSET and FLOWCHECK opcodes are illustrated in FIGS. 4-7. In FIG. 4, the flow of the instruction set occurs as intended by the programmer. As illustrated in FIG. 4 an intended instruction set 114 is provided. The intended instruction set 114 is compiled and produces a set of opcodes to be executed by the CFI-enabled processor 100. Upon compiling the intended instruction set 114, the FLOWSET instruction of the intended instruction set 114 is paired with the FLOWCHECK of the intended instruction set 114 and an address of the FLOWCHECK instruction is determined. The address of the FLOWSET instruction may be determined in a variety of ways including for example, calculating a distance between the FLOWSET and FLOWCHECK instructions.

Upon initiation, data stack pointer 148 is aligned with position 130 of the data stack 102 and CFI shadow stack pointer 168 is aligned with position 150 of the CFI shadow stack. A CALL instruction is provided to the processor 100 to call function "foo" which includes the intended instruction set 114. Upon execution of the CALL function, the address of the instruction to be executed when control returns to the foo call site, i.e., "foo ret address", is pushed to or "written" to position 130 of the data stack 102 and the data stack pointer 148 moves to position 132. The "foo ret address" is also pushed to position 150 of the CFI shadow stack 112 and the CFI shadow stack pointer 168 is moved to positioner 152. Next, function foo provides for execution of a function prologue which sets up a call frame of size F for foo. Specifically, the "push rax" instruction results in the contents of register rax being pushed to position 132 of the data stack 102 and alignment of the data stack pointer 148 with position 134; the "push rbx" instruction results in the contents of register rbx being pushed to position 134 of the data stack 102 and alignment of the data stack pointer 148 with position 136; the "push rcx" instruction results in the contents of register rcx being pushed to position 136 of the data stack 102 and alignment of the data stack pointer 148 with position 138; the data stack pointer is then moved down 32 bytes to accommodate data elements l, m, n, o and the data stack pointer is aligned with position 146 of the data stack 102 Execution of additional instructions, not shown, continues.

Next, the FLOWSET instruction is executed marking the entry point for a block of instructions for which control flow integrity is desired (i.e. a "CFI block of instructions"). Upon execution of the FLOWSET instruction, utilizing the address determined at the time of compiling, the address of the paired FLOWCHECK instruction, "A", is pushed to or "written" to the top of the CFI shadow stack (i.e., position 152) and the CFI shadow stack pointer 168 is aligned with position 154 of CFI shadow stack 112. Upon execution of the indirect branch instruction, control flows to address *, the intended flow address, and execution of the instructions at the intended flow address, *, continues. These instructions include a function epilogue for function foo. Execution of the function epilogue tears down the call frame of size F. Specifically, the data stack pointer 148 is moved up from position 146 to position 138; the contents of register rcx are popped or "read" from the data stack 102, moving the data stack pointer 148 from position 138 to position 136; the contents of register rbx are popped from the data stack 102, moving the data stack pointer from position 136 to position 134; the contents of register rax are popped from the data stack 102, leaving the data register pointer at location 132.

Next, the FLOWCHECK instruction is executed marking the exit point for the block of instructions for which control flow integrity is desired (i.e. a "CFI block of instructions"). Upon execution of the FLOWCHECK instruction, the CFI shadow stack pointer 168 is moved from position 154 to position 152 of the CFI shadow stack 112. The data provided at the top of the CFI shadow stack 112 (i.e., position 152) is read from or "popped" from the CFI shadow stack 112 and is compared to the address of the FLOWCHECK instruction. Here the address popped from position 152 of the CFI shadow stack 112 is "A" and the address of the FLOWCHECK instruction is also "A." Because these addresses match, control flow integrity is confirmed and execution of the program continues.

Upon exit from the CFI block of instructions, a RET instruction, is provided. Execution of the "RET" instruction moves the data stack pointer 148 from position 132 to position 130 and moves the CFI shadow stack pointer 168 from position 152 to position 150. The data provided at the top of the data stack 102 (i.e. position 130) is read from or "popped" from the data stack 102. The data provided at the top of the CFI shadow stack 112 (i.e., position 150) is read from or "popped" from the CFI shadow stack 112. The data popped from the data stack 102 is compared to the data "popped" from the CFI shadow stack 112. Here the data popped from the data stack 102 is "foo ret address" and the data popped from the CFI shadow stack 112 is "foo ret address." The data from each stack 102, 112 matches and control returns to the address at the call site of function foo, without the need for a fault notification.

Another example illustrating operation of the operations associated with the FLOWSET and FLOWCHECK opcodes is illustrated in FIG. 5. As illustrated in FIG. 5 the intended instruction set 114 is again provided however control of the flow of instructions is not maintained and therefore flow of instructions as intended by the programmer does not occur. The intended instruction set 114 is compiled and produces a set of opcodes to be executed by the CFI-enabled processor 100. Upon compiling the intended instruction set 114, the FLOWSET instruction of the intended instruction set 114 is paired with the FLOWCHECK of the intended instruction set 114 and the address of the FLOWCHECK instruction is determined.

Upon initiation, data stack pointer 148 is aligned with position 130 of the data stack 102 and CFI shadow stack pointer 168 is aligned with position 150 of the CFI shadow stack. A CALL instruction is provided to the processor 100 to call function "foo" which includes the intended instruction set 114. Again, upon execution of the CALL function, the address of the instruction to be executed when control returns to the foo call site, i.e., "foo ret address", is pushed to or "written" to position 130 of the data stack 102 and to position 150 of the CFI shadow stack 112.

Next, function foo provides for execution of a function prologue which sets up a call frame of size F and leaving the data stack pointer 148 aligned with position 146 of the data stack. Execution of additional instructions, not shown, continues.

Next, the FLOWSET instruction is executed marking the entry point for a block of instructions for which control flow integrity is desired (i.e. a "CFI block of instructions"). Upon execution of the FLOWSET instruction, the address of the paired FLOWCHECK instruction, "A", is pushed to or "written" to the top of the CFI shadow stack (i.e., position 152) and the CFI shadow stack pointer 168 is aligned with position 154 of CFI shadow stack 112.

Next, an indirect branch instruction is executed within the function foo. Upon execution of the indirect branch instruction, control is intended to flow to the intended address *, however, an attacker has manipulated the address associated with the indirect branch instruction and control passes to the unintended address *!. Those instructions which the programmer intended to execute, but were not executed are illustrated in FIG. 5 by striking through the instruction.

At the unintended address *!, a set of misdirected instructions 170 is provided at address *!. The function provided by these misdirected instructions 170 is titled "bar". The following instructions of the bar function are executed. Instruction add resp, 48, which upon execution moves the data stack pointer 148 from position 146 to position 134. Execution of the instruction pop r11 pops the data from the top position of the data stack 102 and moves the data stack pointer 148 from position 134 to position 132. Upon execution of the RET instruction, the data stack pointer 148 is moved from position 132 to position 130 and the CFI shadow stack pointer is moved from position 154 to position 152. In addition upon execution of the RET instruction, the data provided at the top of the data stack 102 (i.e., position 130) is popped from the data stack 102 and the data provided at the top of the CFI shadow stack (i.e., position 152) is popped from the CFI shadow stack 112. The data popped from the data stack 102 is compared to the data popped from the CFI shadow stack 112. If the data matches, execution of the instruction continues. If the data does not match, a fault notice is provided. Here the data popped from the data stack 102 is "foo ret address" and the data popped from the CFI shadow stack is the address "A". The data does not match, therefore a fault notice is provided. Thus, a fault in the control flow (i.e., misdirection to function bar) was identified and a fault notice was provided.

With respect to the example of FIG. 5, it is noted that the epilogue provided by the misdirected instructions 170 returned the data stack pointer 148 to position 130 of the data stack 102. A FLOWCHECK operation was not provided, however, in the misdirected instructions 170. As a result, the top of the CFI shadow stack 112 did not move to position 150 but rather remained at position 152. As a further result, the data at the top of the stacks 102, 112 did not match.

Another example illustrating the operation of the operations associated with the FLOWSET and FLOWCHECK opcodes is illustrated in FIG. 6. As illustrated in FIG. 6 the intended instruction set 114 is again provided, however control of the flow of instructions is not maintained. The intended instruction set 114 is compiled and produces a set of opcodes to be executed by the CFI-enabled processor 100, however flow of the instruction set as intended by the programmer does not occur. Upon compiling the intended instruction set 114, the FLOWSET instruction of the intended instruction set 114 is paired with the FLOWCHECK of the intended instruction set 114 and the address of the FLOWCHECK instruction is determined.

Upon initiation, data stack pointer 148 is aligned with position 130 of the data stack 102 and CFI shadow stack pointer 168 is aligned with position 150 of the CFI shadow stack. A CALL instruction is provided to the processor 100 to call function "foo" which includes the intended instruction set 114. Again, upon execution of the CALL function, the address of the instruction to be executed when control returns to the foo call site, i.e., "foo ret address", is pushed to or "written" to position 130 of the data stack 102 and to position 150 of the CFI shadow stack 112. A function prologue is again executed setting up a call frame of size F and leaving the data stack pointer 148 aligned with position 146 of the data stack 102. Execution of additional instructions, not shown, continues.

Next, the FLOWSET instruction is executed marking the entry point for a block of instructions for which control flow integrity is desired (i.e. a "CFI block of instructions"). Upon execution of the FLOWSET instruction, utilizing the determined address of the FLOWCHECK instructions, the address of the paired FLOWCHECK instruction, "A", is pushed to or "written" to the top of the CFI shadow stack (i.e., position 152) and the CFI shadow stack pointer 168 is aligned with position 154 of CFI shadow stack 112.

Next, an indirect branch instruction is executed within the function foo. Upon execution of the indirect branch instruction, control is intended to flow to the intended address *, however, an attacker has manipulated the address associated with the indirect branch instruction and control passes to the unintended address *!. Those instructions which the programmer intended to execute, but were not executed are illustrated in FIG. 6 by striking through the instruction.

At the unintended address *!, a set of misdirected instructions 180 is provided at address *!. The function provided by these misdirected instructions 180 is titled "bar". The bar function includes instruction add rsp 48. Execution of the instruction add rsp 48 moves the data stack pointer from position 146 to position 134. Next, the bar function includes the instruction pop 11. Upon execution of the instruction pop r11, the data stack pointer 148 is moved from position 134 to position 132. Next, the bar function includes the instruction FLOWCHECK at address "B". The operation resulting from execution of the FLOWCHECK instruction provides that the CFI shadow stack pointer 168 is moved from position 154 to position 152 and the data at the top of the CFI shadow stack (i.e., position 152) is popped from the CFI shadow stack 112. Here the address "A" is popped from the CFI shadow stack 112. In addition, the data provided at the top of the CFI shadow stack 112 is compared with the address of the FLOWCHECK instruction. Here, the FLOWCHECK instruction appears at address "B" however, the data popped from the CFI shadow stack 112 is "A". Because the data from the top of the CFI shadow stack does not match the address of the FLOWCHECK instruction (i.e. "A"!= "B"), a fault notice is provided.

As noted above, the FLOWSET and FLOWCHECK opcodes are variable independent. Thus, compiling the variable independent FLOWSET and FLOWCHECK instructions will always produce the same opcodes. The ability to detect fault in control flow is achieved through the use of a processor configured to execute the above described FLOWSET and FLOWCHECK operations (i.e., a CFI-enabled processor) without any further explicit specification than the location of the instructions in the software. In certain instances, code containing FLOWSET and FLOWCHECK instructions will need to be executed by a non-CFI enabled processor (i.e., a legacy processor). Because the FLOWSET and FLOWCHECK operations are variable independent, compiling these variable independent FLOWSET and FLOWCHECK instructions will always produce the same opcodes. In order to achieve backwards compatibility, the opcodes associated with the FLOWSET and FLOWCHECK instructions are selected from a pool of reserved NOP opcodes of the processor ISA. As a result, the code containing the FLOWSET and FLOWCHECK instructions can be executed on both CFI-enabled and legacy processors.

Figure 7:
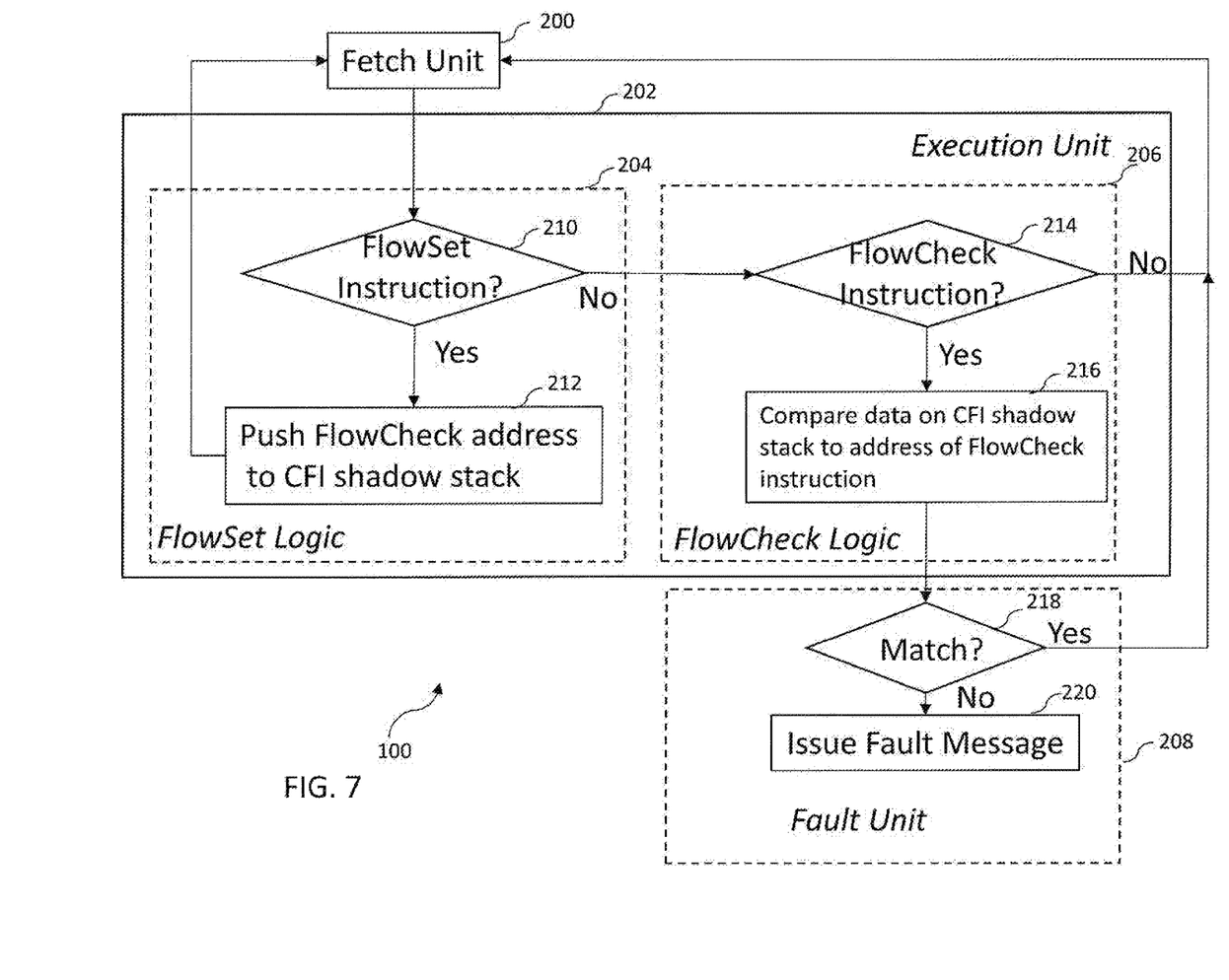
FIG. 7 illustrates the CFI-enabled processor of the present invention including illustration of the operations provided by the FLOWSET and FLOWCHECK opcodes.

FIG. 7 illustrates portions of the CFI-enabled processor 100 of the present invention. Specifically, FIG. 7 illustrates logic associated with the FLOWSET and FLOWCHECK instructions of the ISA 101. As illustrated in FIG. 7, the CFI-enabled processor 100 incudes fetch unit 200, an execution unit 202, and a fault unit 208. The fetch unit 200 is in communication with the execution unit 202 and the fault unit 208. The fetch unit 200 fetches instructions to be executed by the processor 100. The execution unit 202 includes FLOWSET logic 204 and FLOWCHECK logic 206. FLOWSET logic 204 includes logic 210 for determining whether the instruction fetched by the fetch unit 200 is a FLOWSET instruction. FLOWSET logic 204 includes logic 212 for pushing the address of a paired FLOWCHECK instruction to the CFI shadow stack in the event the fetched instruction is a FLOWSET instruction. Flow check logic 206 is in communication with the flow set logic 204 and includes logic 214 for determining whether the fetched instruction is a FLOWCHECK instruction. In the event the instruction fetched is a FLOWCHECK instruction, FLOWCHECK logic 206 includes logic 216 for comparing the data on the CFI shadow stack with the address of the FLOWCHECK instruction. FLOWCHECK logic 206 is in communication with the fault unit 208. Fault unit 208 includes logic 218 for determining whether data of the CFI shadow stack matches the address of the FLOWCHECK instruction. In the event a match is determined, the fetch unit 200 continues to fetch instructions. In the event a match is not found, the fault unit 208 includes logic 220 for issuing a fault notice.

Figure 8:
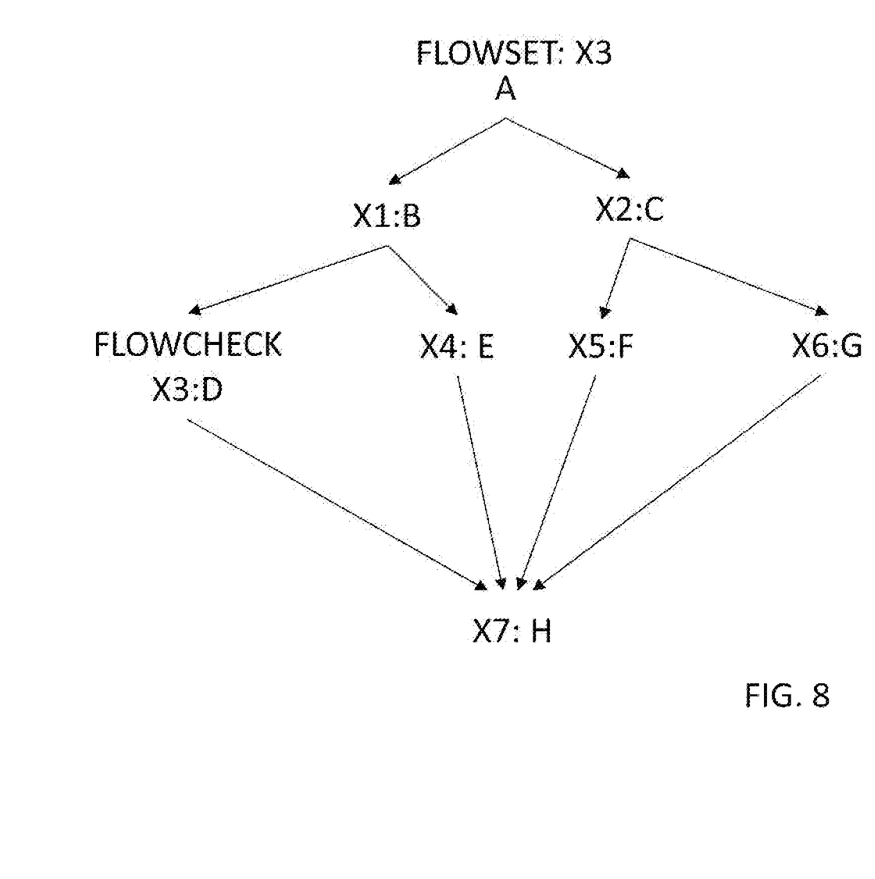
FIG. 8 illustrates use of the FLOWSET and FLOWCHECK opcodes in connection with blocks of code including various direct branches to the blocks of code.

FIGS. 4-6 illustrate use of the ISA instructions of the present invention in connection with an indirect branch instruction to ensure that the destination of the indirect branch intended by the programmer is reached. The FLOWSET and FLOWCHECK opcodes may also be used to ensure a proper flow of program instructions without an indirect branch instruction. For example, as illustrated in FIG. 8, a set of program basic blocks of instructions (A-G) may include multiple flows to a common endpoint instruction (H). In certain scenarios, it may be beneficial to know that the endpoint H was reached via a particular set of flows. Using the FLOWSET and FLOWCHECK pair of instructions, we can provide notice of a fault if such a flow was or was not taken. For example, it may be beneficial to enforce that the endpoint H was reached via flow A-B-D, and only that flow. In this scenario, the FLOWSET instruction is used at the entry point of the set of block of instructions; i.e. at block of instructions A. Upon execution of the FLOWSET instruction, the address of instruction D, i.e., X3, is pushed to the CFI shadow stack. The FLOWCHECK instruction is provided at address X3 . When the FLOWCHECK instruction is executed, address X3 is popped from the top of the CFI shadow stack. If flows A-B-E, A-C-F or A-C-G were to occur due to some unforeseen condition, when the shadow stack aware RET instruction of block H is executed, the return would fault since the X3 at the top of the CFI shadow stack would not match the return address at the top of the data stack. Thus, only the flow through D would release the lock that was set by the FLOWSET. This is an imprecise enforcement scheme since undesired execution could continue after blocks E, F or G before execution reaches H. However if FLOWCHECKS were placed at blocks E, F, and G, then upon reaching execution of the FLOWCHECK opcode at E, F or G, a fault notice would issue immediately since the address at these blocks would not match that stored on the CFI shadow stack (i.e. X3).

A hardware implementation of the invention for maintaining control flow integrity has been described. It is to be understood, however, that the invention for maintaining control flow integrity may be implemented through software. For example, rather than providing a CFI enabled processor which executes FlowSet and FlowCheck opcodes, existing instructions may be provided to a legacy processor which perform similar operations when a CFI enabled processor is not available. An example of pseudo C code providing these similar operations is illustrated below.

foo( ){
// at this point, return address of any caller is stored in 2 separated data structures (e.g. a data stack and shadow stack)
// occurs by: the caller just before branching here and/or in-line here int I, j; // optional local variables
char c;
. . . // optional code
flowset (&FlowLabel); // assign the address of the corresponding label (e.g. FlowLabel) to a data structure (e.g. shadow stack)
. . . // code for which flow integrity must be maintained
branch * // an indirect branch
// code for which flow integrity must be maintained
FlowLabel:
flowcheck(&FlowLabel); // remove the value from the shadow stack and compare to FlowLabel: fault if unequal,
. . . // optional code
checkReturns( ); // remove the return from both data structures and compare: fault if unequal or return to caller if equal.
}

This pseudo codes illustrates a scope of instructions, i.e., those instructions that are intended to execute in the current active call frame and how a function foo would implement flow checks to protect a block of code within its scope. Upon entry into function foo, the return address is written to a top position of the first (data) stack and to a top position of the second (protected/shadow) stack. A series of additional instructions are provided prior to the call of a function "flowset". The flowset function provides a series of instructions to complete a flowset operation. The flowset function results in the address of the instruction which calls a related flowcheck function (i.e. FlowLabel) to be written to a top position of the shadow stack. Subsequently, a block of instructions for which control flow integrity must be maintained are executed. This block of instructions includes a branch instruction providing for branching of instructions at address *. Upon return to function foo, additional instructions within the block are executed. Upon termination of the block of instructions for which control flow integrity must be maintained, the flowcheck function is called. The flowcheck function performs a series of instructions to complete a flowcheck operation. The flowcheck function results in a pop of the shadow stack and a comparison of the data popped from the top position of the shadow stack with the label passed to flowcheck (in this case the FlowLabel address). The flowcheck function further provides instructions for providing a fault notification in the event the address associated with the call of function flowcheck (i.e. FlowLabel) does not match the data popped from the top position of the shadow stack. Upon return of the branch to foo, a checkreturn function is called. Thee checkreturn function performs a series of instructions to compare the data provided at the top position of the data stack with the data provided at the top position of the shadow stack. The checkreturn function further provides a series of instructions for providing a fault notice in the event the data popped from the data stack does not match the data popped from the shadow stack. Completion of the program scope is provided after execution of the checkreturn function.

Several advantages are provided by the CFI-enabled processor of the present invention.

Prior attempts to enforce control flow integrity like landing point instructions and branch flags impose a coarse constraint on forward control flow. As illustrated above, although these course constraints required branching to a landing point, they do not require branching to the precise destination intended by the programmer. The CFI-enabled processor of the present invention, provides a further constraint on the control flow of the instructions that attempt to bypass the imprecise landing point constraint. Similarly, flowset and flowcheck functions employed on legacy processors provide this further constraint. Specifically, if the programmer intended destination of the code block is not reached, a fault notice is issued providing notice of the fault in flow control.

As illustrated and described above, the FLOWSET and FLOWCHECK opcodes mark the entry and exit points for a block of instructions including indirect branches for which CFI is desired. Any added performance overhead incurred as a result of the FLOWSET and FLOWCHECK instructions is roughly proportional to the number of indirect branches in the program that need to be constrained. FLOWSET/CHECK does not need to be invoked around every indirect branch site in a binary image. Typically they just apply to indirect branches that don't affect the stack-frame ordering on the shadow stack. In very specific cases, FLOWSET/CHECK can be used around a set of direct branches so this would not impose any significant performance overhead. It is recognized that the flowset and flowcheck functions for legacy processors provide a more significant overhead on performance due to the significant number of additional operations to be performed.

Although the discussion and figures used Intel x86 instructions, the principle of FLOWSET/CHECK could be easily applied to any general purpose processor. It is not limited a specific ISA.

The FLOWSET and FLOWCHECK instructions of the present invention are backwards compatible, i.e., the instructions can be executed on both legacy and CFI-enabled processors. Because of their atomicity, the FLOWSET and FLOWCHECK opcodes can be associated with reserved NOP operations of the processor. Then if a FLOWSET and FLOWCHECK instrumented binary image is run on a legacy machine, it will not provide the benefits of detecting faults in control flow, but the code will safely execute. This backwards compatibility allows a single version of the code to be utilized by CFI-enabled and legacy processors. It would also allow safe anticipatory implementation by the software vendors in an ecosystem before the hardware is available to the ecosystem. The hardware and software vendor communities do not have to implement a costly and complex synchronization to launch this invention into an ecosystem.

The FLOWSET and FLOWCHECK instructions can easily be incorporated into existing software tool chains such as compilers. Compilers are already aware of all the necessary preconditions to overlay them into the output (e.g. entry and exit points of basic blocks that use indirect branches). FLOWSET and FLOWCHECK have no interdependency with a specific software language.

The presence of FLOWSET/CHECK in an application of several modules (e.g. A, B and C) where module A is not instrumented with FLOWSET/CHECK while module B and C are instrumented, will not adversely affect the functioning the application (e.g. the software vendor may not have access to the source code of A in order to instrument that module). This will allow easy migration to a fully FLOWSET/CHECK instrumentation when the software vendor eventually has the right conditions to complete the instrumentation. Furthermore, once FLOWSET/CHECK's are placed into any module, there is no additional future tool chain work needed to maintain them or link the instrumented module with any other module that might comprise an application. For example, a loader fixup after the program is loaded into memory but before it is started is unnecessary. It is "set and forget".

Unlike many solutions in the past which were either strictly hardware based (i.e. robust but not flexible) or strictly software based (i.e. not robust but flexible), this invention maintains a robust enforcement mechanism while retaining a flexible implementation. The CFI-enabled processor (i.e. hardware) in combination with the FLOWSET and FLOWCHECK instructions strategically placed throughout a binary image (i.e. software) provides a CFI mechanism which cannot be disabled or bypassed with attacker provided software instructions. Meanwhile, a compiler (or other means of generating binary image) and developer can choose to emit, or not, the flow constraints in the software. However, once a FLOWSET/CHECK pairings are added to the software, the hardware is immutable in enforcing the intent expressed by the software. This is much more desirable than (mutable) software enforcing the integrity of the software control flow.

While preferred embodiments of the present invention are shown and described, it is envisioned that those skilled in the art may devise various modifications of the present invention without departing from the spirit and scope of the appended claims.

What is claimed is:

1. A processor for detecting a fault in control flow comprising:
   an instruction set architecture defining a FLOWSET opcode and an associated FLOWSET operation and a paired FLOWCHECK opcode and an associated FLOWCHECK operation;
   a CFI shadow stack having a top position;
   wherein upon execution of said FLOWSET opcode paired with said FLOWCHECK opcode, said FLOWSET operation writes an address of said paired FLOWCHECK opcode to said top position of said CFI shadow stack;
   wherein upon execution of the FLOWCHECK opcode, said FLOWCHECK operation reads data at said top position of said CFI shadow stack and said data at said top position of said CFI shadow stack is compared to an address of said FLOWCHECK operation; and
   wherein if said data does not match said address, a fault notice is issued.

2. The processor as defined in claim 1, wherein said FLOWCHECK opcode is variable independent.

3. The processor as defined in claim 1, further comprising:
   a fetch unit to fetch opcodes; and
   an execution unit in communication with said fetch unit to execute fetched opcodes.

4. The processor as defined in claim 3, further comprising:
   a fault notification unit in communication with said execution unit, said fault notification unit providing said fault notice.

5. The processor as defined in claim 1, wherein said FLOWSET opcode is variable independent.

6. The processor as defined in claim 1, wherein said processor further comprises:
   a data stack;
   wherein said instruction set architecture defines a CALL opcode and an associated CALL operation and a RET opcode and associated RET operation;
   wherein upon execution of said CALL opcode, said CALL operation writes the return address to the CFI shadow stack; and
   wherein upon execution of said RET opcode, said RET operation reads the data at the top positions of the CFI shadow stack and the data stack and compares the data read from the CFI shadow stack to the data read from the data stack.

7. A method of detecting a fault in control of a flow of instructions comprising the steps of:
   providing a processor including:
   a CFI shadow stack having a top position;
   an instruction set architecture defining a FLOWSET opcode and an associated FLOWSET operation and a FLOWCHECK opcode and an associated FLOWCHECK operation;
   pairing a FLOWSET opcode and a FLOWCHECK opcode;
   executing said FLOWSET opcode wherein upon execution of said FLOWSET opcode an address of said paired FLOWCHECK opcode is pushed to said CFI shadow stack;
   executing said FLOWCHECK opcode, wherein upon execution of said FLOWCHECK opcode, the address of said FLOWCHECK opcode is compared to the data at said top position of said CFI shadow stack; and
   issuing a fault notice when said data and said address do not match.

8. The method of claim 7, further comprising the step of:
executing an indirect branch opcode after executing a FLOWSET opcode.

9. The method of claim 8, wherein said processor further includes a data stack having a top position and wherein said instruction set architecture defines a CALL opcode and an associated call operation and a RET opcode and an associated return operation; the method further including the steps of:
executing said CALL opcode, wherein upon executing said CALL opcode the address of the instruction to be executed when control returns to the call site is written to a top of said data stack and to a top of said CFI shadow stack;
executing said RET opcode, wherein upon executing said RET opcode, data at the top of the data stack is compared to data at the top of the CFI shadow stack; and when said data to the top of the data stack does not match the data at the top of the CFI shadow stack, a fault notice is provided.

10. A method of providing control flow integrity to a set of program instructions to be performed by a processor, comprising the steps of:
determining whether said processor is legacy processor or a CFI-enabled processor;
executing a FLOWSET instruction, wherein when said FLOWSET instruction is executed by a legacy processor a NOP is executed and when said FLOWSET instruction is executed by a CFI-enabled processor, the address of said paired FLOWCHECK instruction is pushed to a CFI shadow stack; and
executing a FLOWCHECK instruction, wherein when said FLOWCHECK instruction is executed by a legacy processor, a NOP is executed and when said FLOWCHECK instruction is executed by a CFI-enabled processor having an associated CFI shadow stack and CFI shadow stack pointer, the address of said FLOWCHECK instruction is compared to the data associated with said CFI shadow stack pointer, and a notice of fault is generated when said data does not match said address.

11. A method of providing control flow integrity to set of program instructions, comprising the steps of:
identifying a block of instructions for which control flow integrity is to be maintained;
providing a flowset function for performing a flowset operation within the scope of said block of instructions and prior to said block of instructions;
providing within the scope of said block of instructions and subsequent to said block of instructions, a flowcheck function for performing a flowcheck operation related to said flowset operation;
providing a flowcheck operation call instruction;
upon executing said flowset operation, writing an address of said flowcheck operation call instruction to a shadow stack;
upon executing said flowcheck operation, comparing the address of said flowcheck operation call instruction with data provided at a top position of said shadow stack; and
when said address does not match said data, issuing a fault notification.

12. The method of claim 11, further comprising the steps of:
providing a checkreturn function for performing a checkreturn operation;
upon executing said checkreturn operation, reading the data at the top positions of a data stack and the shadow stack;
comparing the data form the top position of said data stack with the data from the top position of said shadow stack; and
issuing a fault notification when the compared data does not match.

* * * * *